United States Patent [19]

Frantz et al.

[11] Patent Number: 4,582,384

[45] Date of Patent: Apr. 15, 1986

[54] OVERMOLDED SHIELDED CONNECTOR

[75] Inventors: Robert H. Frantz, Newville; Earl W. McCleerey, Mechanicsburg; Earl C. Myers, Jr., Harrisburg; Charles E. Reynolds, Mechanicsburg, all of Pa.

[73] Assignee: AMP Incorporated, Harrisburg, Pa.

[21] Appl. No.: 607,073

[22] Filed: May 4, 1984

[51] Int. Cl.4 .......................... H01R 13/46; B29B 3/00

[52] U.S. Cl. ................................ 339/143 R; 264/273; 264/276; 339/218 M

[58] Field of Search ................... 264/272.13, 273, 274, 264/276; 339/143 R, 136 R, 138, 141, 117 R, 117 P, 118 R, 118 RY, 218 R, 218 M; 137/855, 505, 455

[56] References Cited

U.S. PATENT DOCUMENTS

| | | | |
|---|---|---|---|
| 1,771,635 | 7/1930 | Hubbell, Jr. | 339/195 R |
| 1,971,396 | 8/1934 | Waide | 264/273 |
| 2,688,581 | 9/1954 | Stubbs | 264/273 |
| 3,093,434 | 6/1963 | Francis | 339/195 |
| 3,366,512 | 1/1968 | Jammet | 264/273 |
| 3,401,369 | 9/1968 | Palmateer et al. | 339/17 |
| 3,514,231 | 5/1970 | Belden | 137/855 |
| 3,609,463 | 9/1971 | Laboue | 317/101 DH |
| 3,967,162 | 6/1976 | Ceresa et al. | 317/101 CM |
| 3,978,581 | 9/1976 | Miura | 264/272 |
| 4,011,819 | 3/1977 | Kessler | 264/273 |
| 4,077,688 | 3/1978 | Cobaugh et al. | 339/74 R |
| 4,077,694 | 3/1978 | Cobaugh et al. | 339/176 MP |
| 4,095,750 | 6/1978 | Gilead | 137/855 |
| 4,168,393 | 9/1979 | Silva | 264/273 |
| 4,288,139 | 9/1981 | Cobaugh et al. | 339/74 R |
| 4,337,989 | 7/1982 | Asick et al. | 339/143 R |
| 4,457,576 | 7/1984 | Cosmos et al. | 339/143 R |
| 4,497,533 | 2/1985 | Genova et al. | 339/143 R |

FOREIGN PATENT DOCUMENTS

| | | | |
|---|---|---|---|
| 1414922 | 9/1965 | France | 137/855 |

OTHER PUBLICATIONS

"Box Type Circuit Chassis", AT&T Technical Digest, No. 75, Sep. 1984.

*Primary Examiner*—Gil Weidenfeld
*Assistant Examiner*—Gary F. Paumen
*Attorney, Agent, or Firm*—Russell J. Egan; F. Brice Faller

[57] ABSTRACT

An improved shielding assembly for an overmolded electrical connector is formed by a pair of mating metal shell members which engage a peripheral metal housing of a standard connector and enclose the rear conductor exiting portion thereof. The shell members each include embossed strengthening means as well as interengaging side walls to completely enclose the rear of an electrical connector. The shell members are each further provided with overmolding pressure release means which opens at a predetermined pressure and allows a limited amount of overmolding material to enter the shell members while equalizing the inner and outer shell member pressures. The shell members also include gripping apertures which allow overmolding material to enter and harden thereby becoming fixedly attached to the shell members to prevent withdrawal due to shrinking as the overmold material cools. At least one of the shell members is preferably provided with continuity tines which positively engage the metal housing of the connector to assure good electrical contact therewith. The shell members can also include an interdigitating profile which assures proper relative positioning of the shell members.

3 Claims, 12 Drawing Figures

OVERMOLDED SHIELDED CONNECTOR

The present invention relates to a shielded connector which is overmolded with an insulative layer and in particular to an improved shielding which will withstand the overmolding operation.

The present FCC requirements have caused the increased use of shielding in electrical connectors. While many forms of shielding have proven to be quite satisfactory, they are not always aesthetically pleasing. For this reason it has been found that shielded connectors which are overmolded with an insulative layer produce a much more aesthetically pleasing appearance, as well as to assure the continuity of the shielding. However, this has created some problems in the past in that the overmolding operation generates very high pressures which have, in some instances, crushed the shielding resulting in both destroying the electrical characteristics thereof as well as to allow flow of the overmold material into the terminal cavities freezing the terminals into fixed positions and driving them to misaligned conditions.

The present invention overcomes the deficiencies of the prior art by providing a multi-part metal shield for an electrical connector of known configuration. The known connector has a plastic housing containing a plurality of terminals in a like plurality of terminal passages and has a pair of metal housing members forming a peripheral mounting flange on the insulative housing. The subject invention includes a pair of mating metal shell members each of which has a forward end engageable with the metal members of the connector, interengaging integral side walls and together defining an annular cable exit. The metal shielding shell members are further each provided with strengthening embossments, pressure relief vent means, gripping apertures, and electrical continuity assurance barbs.

The present invention will now be described by way of example with reference to the accompanying drawings in which.

Figure 1:
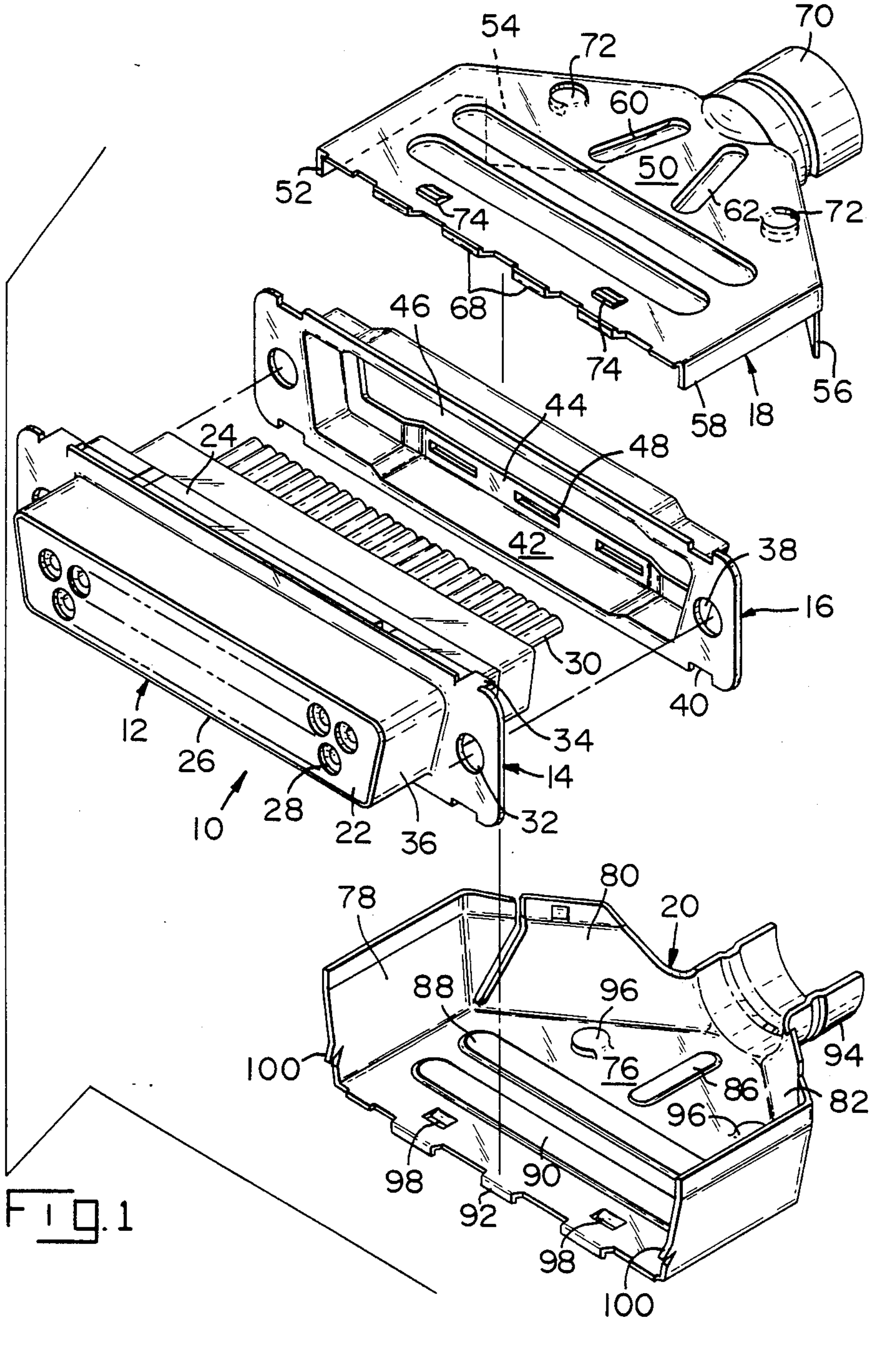
FIG. 1 is an exploded perspective view of the present invention together with a known electrical connector.

The subject shielded electrical connector assembly 10 is formed by a known electrical connector 12, first and second metal housings 14, 16 and a pair of rear metal shells 18, 20. The connector 12 shown is one of a well-known type, namely, a miniature D connector of the type manufactured by the assignee AMP incorporated and sold under the trade name AMPLIMITE. This connector 12 has an insulative housing 22 with an integral peripheral flange 24 and a front mating face 26 with a plurality of terminal passages 28 therein. Each passage 28 has a suitable terminal (not shown) mounted therein and used to terminate the respective conductors of a cable 30.

The metal housings 14 and 16 are each integral stamped and formed metal members. The front housing 14 has mounting apertures 32 and gripping lugs 34 and is received against the front surface of the flange 24. The front housing 14 can be provided with an integral shroud 36 enclosing the forward end of the housing 22. The rear housing 16 has a similar outer profile with apertures 38 aligned with the apertures 32 and recesses 40 aligned to receive the respective lugs 34. The rear housing 16 is also profiled to define a cavity 42, which receives a rear portion of the housing 22 of connector 12, as well as a rear flange of 44 having a central passage 46 and a plurality of slots 48 along the marginal edges thereof.

The one rear shell 18 is a stamped and formed integral metal member having a generally planar wall 50 surrounded by depending side walls 52, 54, 56, 58. The planar wall 50 is profiled to have first embossments 60, 62, second embossments 64, 66, forwardly directed gripping tines 68, a semicylindrical rearwardly directed cable exit 70, at least one pressure relief vent 72 and at least one overmold grip means 74.

The other rear shell 20 is somewhat similar to shell 18 having a planar wall 76 surrounded by side walls 78, 80, 82, 84, a first embossment 86, second embossments 88, 90, forwardly directed gripping tines 92, rearwardly directed semicylindrical cable exit 94, pressure relief vent 96, overmold gripping means 98 and continuity tines 100.

Figure 2:
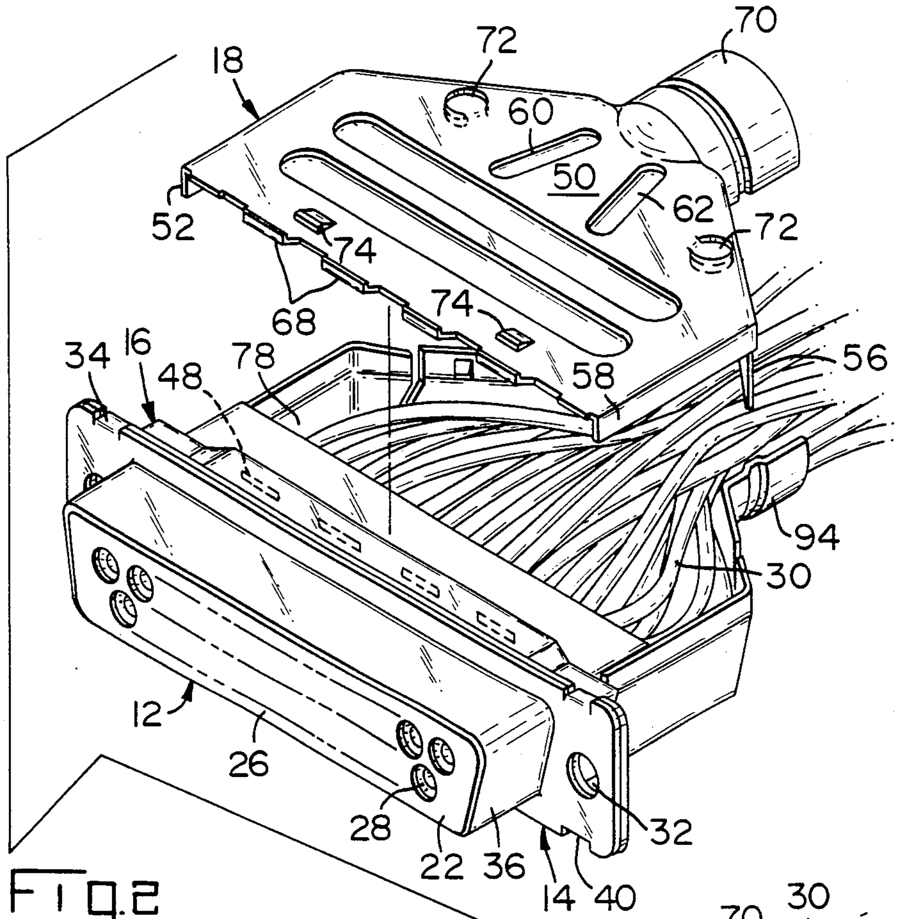
FIG. 2 is a view similar to FIG. 1 showing the subject connector in a partially assembled condition with only one shell member exploded therefrom.
Figure 3:
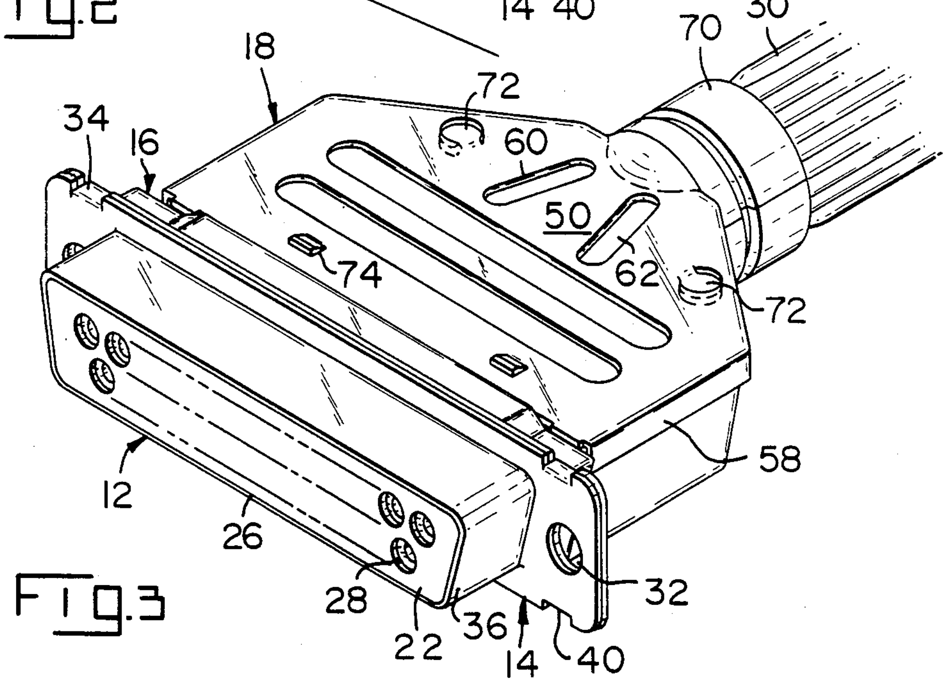
FIG. 3 is a view similar to FIGS. 1 and 2 showing the subject invention in a fully assembled condition.
Figure 4:
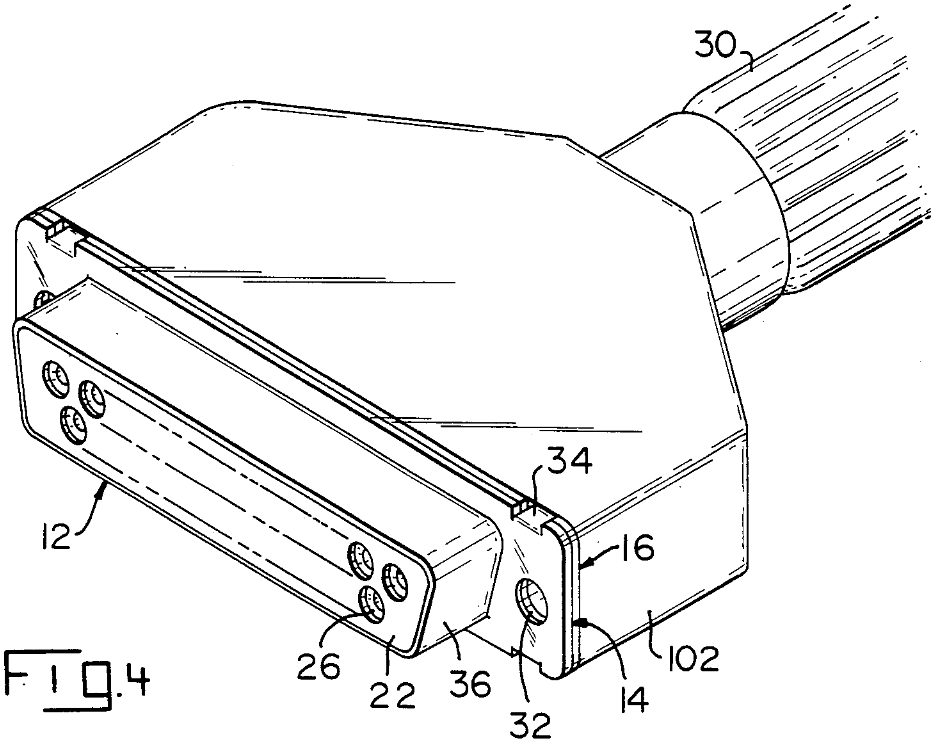
FIG. 4 is a view similar to FIGS. 1 through 3 showing the subject invention after the overmolding operation.
Figure 12:
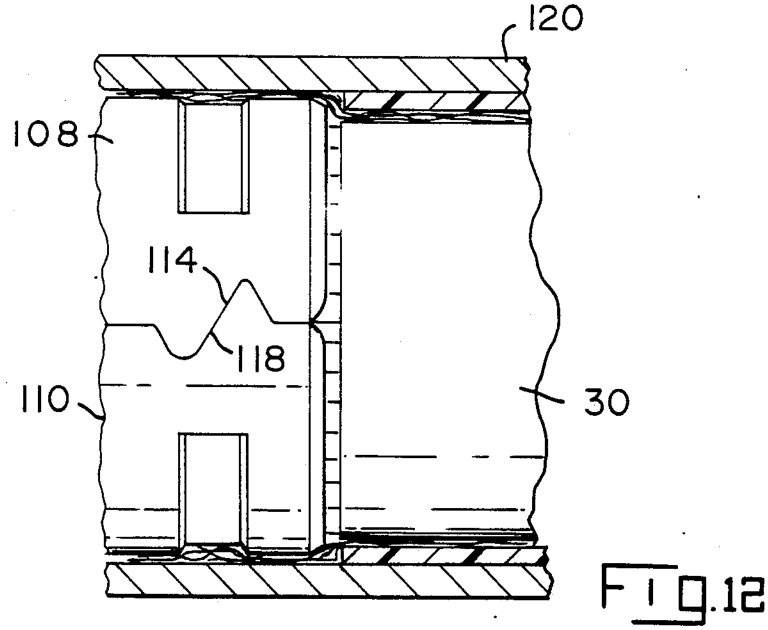
FIG. 12 is a side elevation of a detail of the embodiment of FIG. 11.
Figure 5:
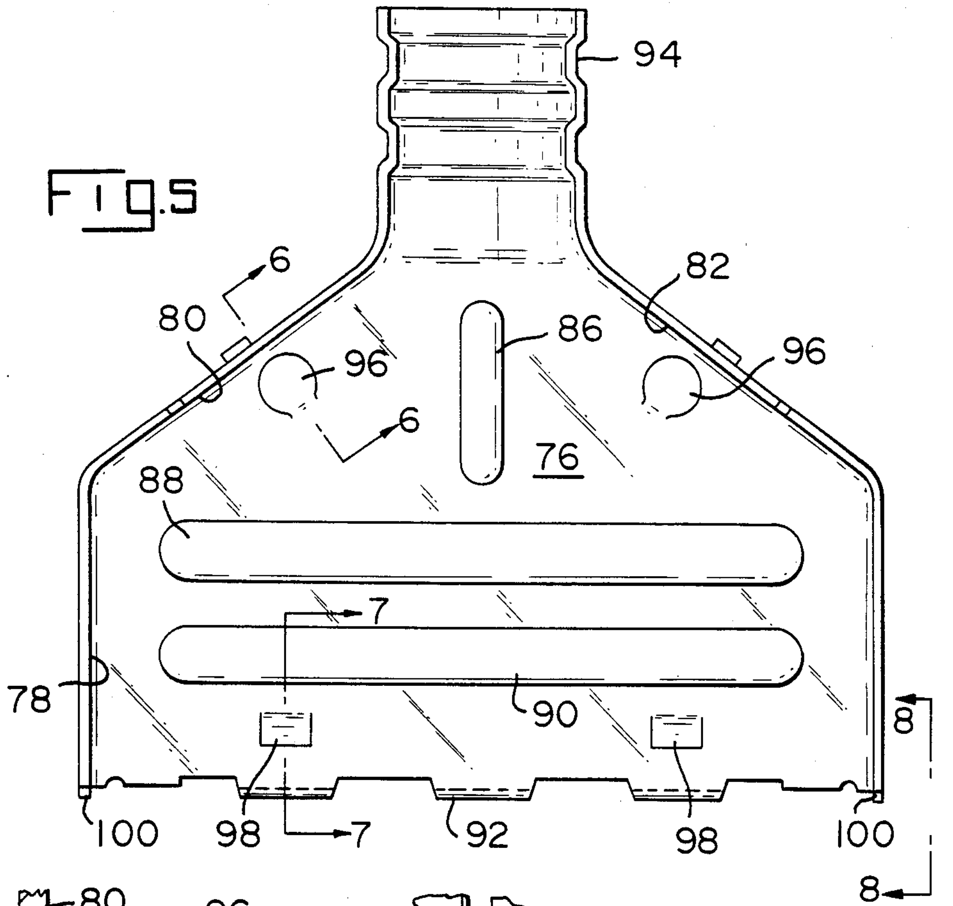
FIG. 5 is a plan view of one shell member of the subject invention.

The electrical connector 12 and the housings 14, 16 are formed in the usual manner and loaded with terminals. These terminals are then used to engage and terminate the appropriate conductors of the cable 30 in any well-known manner such as crimping or insulation piercing. It should be pointed out that in this assembled condition, the housings 14, 16 are joined on opposite sides of the flange 24 and are secured together by the lugs 34 being clinched over recesses 40 in the rear housing 16. The rear shells 18, 20 are applied by putting the tines 68, 92 into the respective slots 48 and appropriately aligning the shells as shown in FIG. 2. The rear shells 18, 20 are rotated toward each other so that the side walls 52, 54, 56, 58 overlap the respective side walls 78, 80, 82, 84 and form a gripping engagement therewith. It should be noted that when the shells 18, 20 are fully in place, as shown in FIG. 3, the continuity tines 100 will make a positive engagement with the rear housing 16, as shown in detail in FIG. 8. The subject connector assembly of FIG. 3 is now ready for the overmolding operation, FIG. 4 showing the assembly with overmolding 102 in place.

Figure 6:
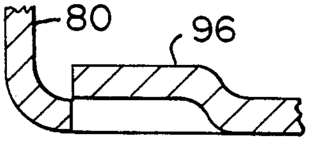
FIG. 6 is a partial section taken along line 6—6 of FIG. 5.
Figure 9:
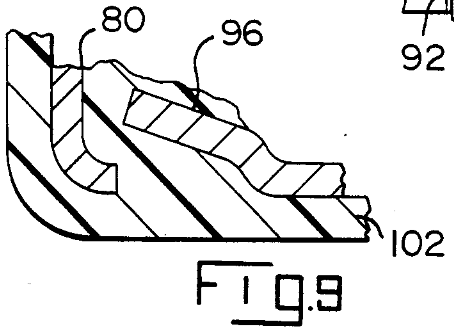
FIG. 9 is a partial section similar to FIG. 6 but taken after the overmolding operation.

An overmolding operation can develop tremendous pressures and for this reason pressure relief vents 72, 96 have been stamped and formed in the rear shells 18, 20. Each vent 72, 96 comprises a generally circular aperture sheared completely through the surrounding shell about most of its periphery, the blank stamped from the aperture remaining hinged to the surrounding shell where it is not sheared through. As shown in FIG. 6, the plane of the blank is parallel to the plane of the surrounding shell but displaced into the cavity enclosed by the shells, the aperture remaining closed by the blank. The size and shape of the vents are engineered to cause the blank to hinge into the cavity when a predetermined molding pressure is achieved, allowing some of the plastic 102 to flow into the cavity formed by shells 18, 20, as shown in FIG. 9. This relieves the pressure of the overmolding operation and balances the pressure within the shells by allowing a limited amount of plastic to flow into the cavity without sufficient material entering to affect the normal free float and alignment of the terminals carried by the connector.

Figure 10:
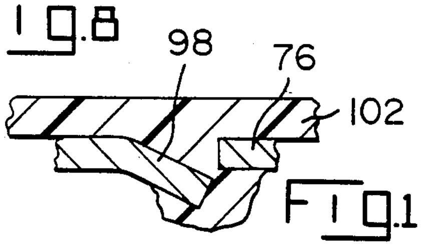
FIG. 10 is a partial section similar to FIG. 7 but taken after the overmolding operation.

The gripping means 74, 98 each also to allow a limited amount of overmold material 102 to flow into the central cavity, as shown in FIG. 10. These gripping means 74, 98 are formed adjacent the front edge of the shells and directed so that as the material 102 flows into them and hardens, it will be prevented from pulling back or shrinking as the overall overmold 102 cools. Thus a good overmolded connector, such as shown in FIG. 4, will be formed.

The shells 18, 20 are provided with first embossments 60, 62, and 86 which run generally in line with the spreading direction of the conductors of the cable 30. This assures that there will be no possibility of the conductors being crushed and/or shorted should the shells 18, 20 collapse. The shells 18, 20 have further embossments 64, 66, 68, 90 which are parallel and oppositely spaced and serve as an added strengthening means.

Figure 8:
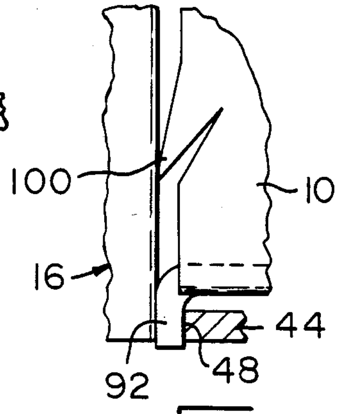
FIG. 8 is a side elevation, partially in section, taken along line 8—8 of FIG. 5.
Figure 7:
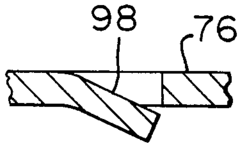
FIG. 7 is a partial section taken along line 7—7 of FIG. 5.

The continuity tines 100, as best illustrated in FIG. 8, assure electrical and mechanical engagement between the shells 18, 20 and the rear housing 16.

Figure 11:
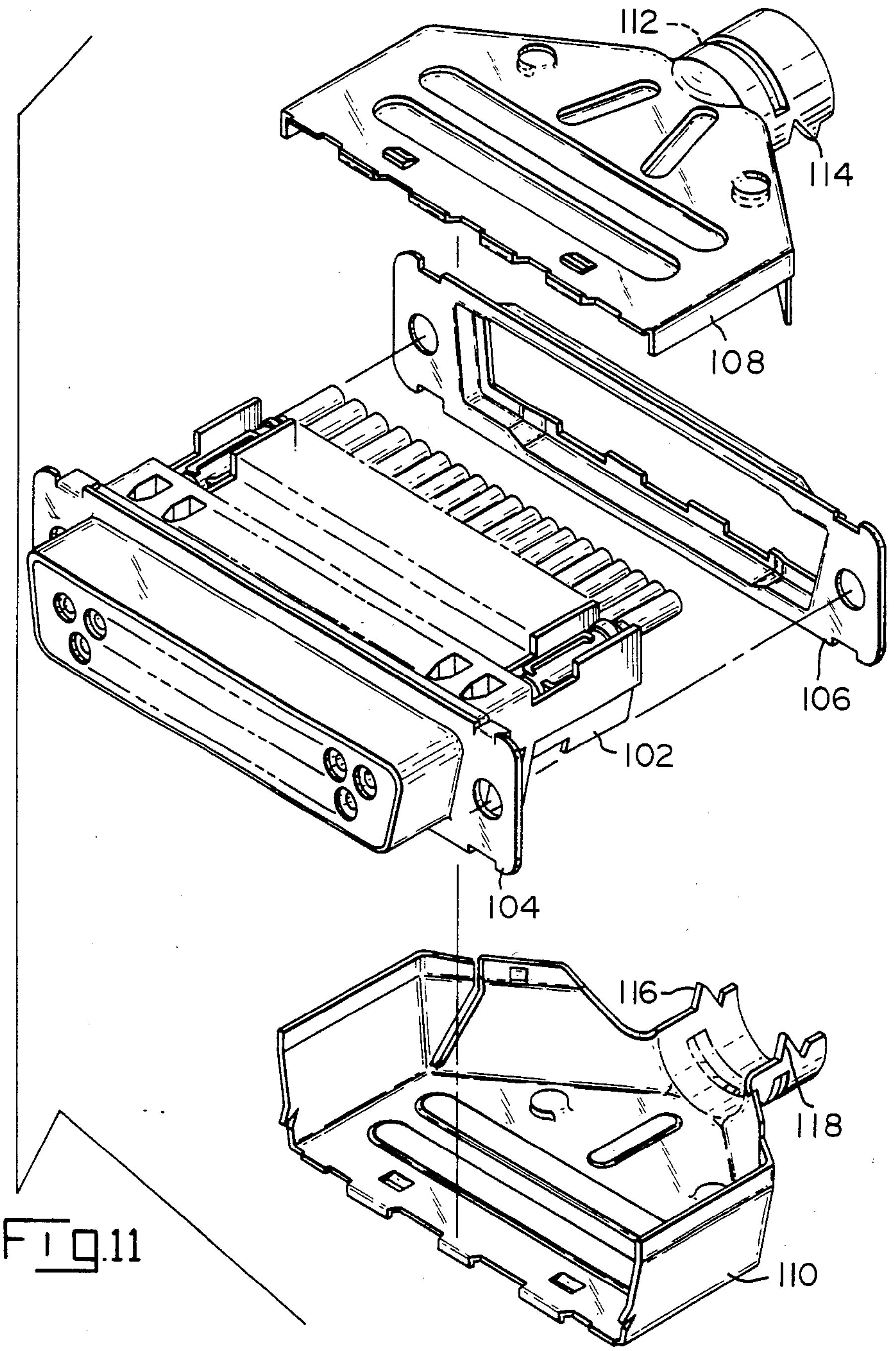
FIG. 11 is a fully exploded perspective view of a first alternate embodiment of the present invention.

FIG. 11 shows an alternate embodiment of the present invention. The connector 102 is similar to connector 12 but dimensioned differently. The metal housings 104, 106 are similar to housings 14, 16 except housing 16 has grooves 108 in place of slots 48. The metal shells 108, 110 are similar to shells 18, 20 but are provided with interdigitating profiles 112, 114, 116, 118 which have a generally sinusoidal pattern which, when mated, force the shells 108, 110 into their proper relationship. Any gaps formed by the profiles are concealed by crimp ring 120.

We claim:

1. A shielded electrical connector assembly of the type comprising an insulative housing having a front mating face and a rear conductor receiving face, a plurality of terminals in said housing, and stamped and formed metal shell means enclosing the rear conductor receiving face of the housing and a cavity extending rearward therefrom, the connector being characterized by at least one pressure relief vent stamped and formed in the shell means, each vent comprising an aperture sheared completely through the shell means about only a portion of its periphery, the blank stamped therefrom remaining hinged to the surrounding shell means, the aperture remaining closed by the blank unless excessive exterior pressure during an overmolding operation is relieved by inward movement of the blank.

2. A connector assembly as in claim 1 characterized in that the plane of the blank is parallel to but spaced from the plane of the shell means surrounding the aperture.

3. A connector assembly as in claim 1 characterized in that the blank is displaced toward the cavity from the surrounding aperture.

* * * * *